US005613990A

United States Patent [19]
Diachuk

[11] Patent Number: 5,613,990
[45] Date of Patent: Mar. 25, 1997

[54] AIR CLEANING SYSTEM FOR MECHANICAL INDUSTRIAL PROCESSES

[75] Inventor: Wolodymyr Diachuk, Golden Valley, Minn.

[73] Assignee: Helical Dynamics, Inc., Golden Valley, Minn.

[21] Appl. No.: 413,874

[22] Filed: Mar. 28, 1995

[51] Int. Cl.[6] .................................................. B01D 45/04
[52] U.S. Cl. ........................ 55/383; 55/385.2; 55/418; 55/DIG. 18; 95/31; 95/273; 454/56; 454/66; 454/67
[58] Field of Search ..................... 95/23, 31, 284, 95/273; 55/DIG. 18, DIG. 29, 383, 385.1, 385.2, 418; 454/49, 56, 57, 58, 66, 67

[56] References Cited

U.S. PATENT DOCUMENTS

| | | | |
|---|---|---|---|
| 2,565,933 | 8/1951 | Schneible | 454/66 |
| 2,579,401 | 12/1951 | Schneible et al. | 454/66 |
| 2,924,062 | 2/1960 | Sutcliffe | 55/DIG. 18 |
| 3,021,776 | 2/1962 | Kennedy | 454/57 |
| 3,049,069 | 8/1962 | Whiston et al. | 454/56 |
| 3,655,361 | 4/1972 | Brown et al. | 55/418 |
| 3,707,069 | 12/1972 | Pike | 55/418 |
| 3,786,739 | 1/1974 | Wright | 454/67 |
| 3,897,721 | 8/1975 | Fuhst | 55/418 |
| 4,023,473 | 5/1977 | Russell | 55/DIG. 18 |
| 4,038,056 | 7/1977 | Diachuk et al. | 55/238 |
| 4,160,407 | 7/1979 | Duym | 55/DIG. 18 |
| 4,216,003 | 8/1980 | Diachuk | 55/356 |
| 4,249,463 | 2/1981 | Hornby | 55/DIG. 18 |
| 4,255,169 | 3/1981 | Leliaert et al. | 55/DIG. 18 |
| 4,350,504 | 9/1982 | Diachuk | 422/105 |
| 4,353,715 | 10/1982 | Mir et al. | 95/37 |
| 4,364,754 | 12/1982 | Diachuk | 55/269 |
| 4,382,807 | 5/1983 | Diachuk | 55/269 |
| 4,460,386 | 7/1984 | Diachuk | 95/220 |
| 4,741,257 | 5/1988 | Wiggin et al. | 55/DIG. 18 |
| 4,820,318 | 4/1989 | Chang et al. | 95/141 |
| 4,863,495 | 9/1989 | Rafson | 95/206 |
| 4,881,957 | 11/1989 | Shofner | 95/23 |
| 4,902,315 | 2/1990 | Spicer | 95/273 |
| 4,986,836 | 1/1991 | Tandon | 96/111 |
| 5,024,681 | 6/1991 | Chang | 95/70 |
| 5,078,758 | 1/1992 | Maller et al. | 95/211 |
| 5,085,673 | 2/1992 | Bentley et al. | 95/29 |
| 5,089,033 | 2/1992 | Wijmans | 95/39 |
| 5,102,433 | 4/1992 | Marcks | 95/229 |
| 5,108,469 | 4/1992 | Christ | 95/214 |
| 5,110,331 | 5/1992 | Williams | 55/302 |
| 5,120,335 | 6/1992 | Gorlich et al. | 219/121.5 |
| 5,122,165 | 6/1992 | Wang et al. | 95/92 |
| 5,123,936 | 6/1992 | Stone et al. | 95/65 |
| 5,129,930 | 7/1992 | Gauthier et al. | 55/394 |
| 5,178,656 | 1/1993 | Schott | 55/450 |

OTHER PUBLICATIONS

Gunderson, E. & Anderson, C., "Collection Device for Separating Airborne Vapor and Particulates", *Am. Ind. Hyg. Assoc. J.*, 48(7); 634–638 (1987).

Professor William C. Hienz, *Aerol Technology, Property, Behavior and Measurement of Airborne Particles*, "[t]he Mechanics of clouds are more complicated than that for individual particles, and a complete description [of cloud behavior] does not exist." (Chapter 17, p. 347).

*Primary Examiner*—Jay H. Woo
*Assistant Examiner*—Duane S. Smith
*Attorney, Agent, or Firm*—Patterson & Keough, P.A.

[57] ABSTRACT

An air cleaning system for treating contaminated air from a mechanical industrial process containing a heterogenous multi-component mixed density fluid (e.g., mist, vapor and/or smoke) that addresses the cloud-like behavior of this contaminated air. The air cleaning system continuously captures a contaminated air volume emitted during operation of the mechanical industrial process and mixes that contaminated air volume with an ambient air volume in order to produce a mixed air volume having certain characteristic temperatures and air velocities. The characteristics of the mixed air volume are controlled such that the mixed air volume does not exhibit cloud-like behavior when transferred via a conduit structure to an air cleaning apparatus or the like.

34 Claims, 11 Drawing Sheets

AIR CLEANING SYSTEM FOR MECHANICAL INDUSTRIAL PROCESSES

RELATED APPLICATIONS

The present invention is related to two co-pending applications in the United States Patent and Trademark Office, the first of which is filed concurrently herewith and entitled "SOURCE CAPTURE SYSTEM FOR AN AIR CLEANING SYSTEM", application Ser. No. 08/413,202, and the second of which was filed on Mar. 23, 1995, entitled, "MODULAR AIR CLEANING SYSTEM", application Ser. No. 08/409,828, both of which are assigned to the assignee of the present invention, and the disclosure of each of which is incorporated by reference herein.

BACKGROUND OF THE INVENTION

1. Field of the Invention

The present invention relates generally to air cleaning systems for capturing and treating contaminated air or emissions from mechanical industrial processes, and more particularly, to a system for cleaning contaminated air from a wet or dry mechanical industrial process, such as machining, material working or the like, which addresses the cloud-like behavior of contaminated air containing a heterogenous multi-component mixed density fluid (e.g., mist, vapor and/or smoke) that is generated by such a mechanical industrial process.

2. Description of Related Art

In the field of mechanical industrial processes, such as machining, metal working, material fabrication and the like, it is well known to use some type of air cleaning system to capture and treat the contaminated air and other emissions produced by the industrial process. During operation of these types of mechanical industrial processes, contaminated air containing mist, vapor, and smoke is produced, particularly whenever liquid coolants are used on, or near, the working surface of the operation. In a cutting or grinding operation, for example, liquid coolant is evaporated and thrown by the cutter or grinder into the air space surrounding the work area. Although large coolant droplets and chips of material may fall to the ground, small coolant droplets, mist and vapor and very small pieces of material and dust become suspended in the air space surrounding the work area to form a thick haze of contaminated air.

Many early air handling systems for industrial processes simply captured the contaminated air by use of a hood or other source capture mechanism, and then vented the contaminated air and other emissions directly to the outside. With the advent of air pollution regulations, these systems began to include air cleaning apparatus in an effort to remove harmful contaminates from the air stream prior to venting it to the outside. Over the years many different types of air cleaning apparatus have been used in an effort to clean up the contaminated air and other emissions from industrial processes. Typically, contaminated air would be captured at multiple locations or work areas within a factor, for example, and then routed by ventilation duct work to a common air cleaning apparatus, often located outside the factory. A variety of different dust collection and/or mist removal apparatus, such as helical separators, cyclone separators, scrubbers, mechanical and electrical filters and the like, have been used to clean the contaminated air once it is within the air cleaning system. Examples of these type of apparatus are shown in U.S. Pat. Nos. 4,038,056, 4,216,003, 4,364,754, 4,382,807, 4,460,386, 4,350,504, 5,024,681, 5,110,331, 5,120,335, 5,129,930 and 5,178,656, as well as the Heli-Flow® system manufactured by the assignee of the present invention, the *Monsanto Organic Package System* manufactured by Monsanto Enviro-Chem Systems, Inc., St. Louis, Mo. and the *Duct Type Mist Separator KNA* manufactured by Delbag Luftfilter, Germany.

Regardless of the type of dust collection and/or mist removal apparatus used for an air cleaning system, most existing air cleaning systems attempt to remove contaminants in an air stream by treating the contaminants as discrete particles. Typically, the contaminants in the air stream from a mechanical industrial process will be either in the form of mist (small droplets of liquid suspended in the air stream), or smoke/dust (small particulates of solid suspended in the air stream), or both. As a result, the theory behind the operation of these dust collection and/or mist removal apparatus relies on some type of physical separation of the discrete particles of mist and/or smoke from the air stream. Such a physical separation can occur, for example, as a result of the direct impact of the particles with the fibers of a filter, the centrifugal force imparted to the particles by a cyclonic apparatus, or the addition of an electrostatic charge to the particles.

An increasing number of mechanical industrial processes, however, also generate a significant amount of vapor, as well as smoke and/or mist as part of the contaminated air stream. Vapor is typically generated when a liquid is used in the mechanical industrial process, such as for cooling or lubricating. Due to the heat energy dissipated during the mechanical industrial process, a portion of the liquid is evaporated into a gaseous phase vapor. Unfortunately, existing dust collection and/or mist removal apparatus which rely on physical separation of discrete particles simply cannot handle a gaseous phase vapor as part of a contaminated air stream. Because there are no physically discrete liquid phase or solid phase particles in a gaseous phase vapor, the gaseous phase vapor component of a contaminated air stream will pass through the dust collection and/or mist removal apparatus unaffected.

Air treatment systems have been designed for vapor removal, such as removal of volatile organic compounds (VOCs) and the like. The problem with existing vapor removal systems is that these systems were developed primarily for chemical processes, and typically require a relatively clean air stream that is free of particulate contaminates. Note, for example, the vapor removal systems as shown in U.S. Pat. Nos. 4,820,318 and 5,089,033 and Gunderson, E. and Anderson, C., "Collection Device for Separating Airborne Vapor and Particulates", *Am. Ind. Hyg. Assoc. J.*, 48(7); 634–638 (1987), which use a membrane or adsorption separation process to recover the condensable vapor component of the air stream. While this is very feasible in a chemical process, the particulate contaminants produced by a mechanical industrial process would quickly destroy any type of membrane or adsorption separation system. Other types of vapor removal systems, such as shown in U.S. Pat. Nos. 4,353,715, 4,986,836 and 5,123,936, use some type of particulate filter to cleanse the contaminated air stream before attempting to remove any vapor components. While this is feasible for air that is only mildly contaminated with particulates, such filter systems are quickly plugged in the dirty environments typically associated with most mechanical industrial processes. Still other types of vapor removal systems, such as shown in U.S. Pat. Nos. 4,863,495, 5,078,758, 5,085,673, 5,102,433, 5,108,469 and 5,122,165, attempt to remove vapors by combining the contaminated air stream with an aqueous mixture and then removing the resulting liquid. While this process is useful in certain situations, the process can be expensive and complicated, and adds significant amounts of liquids to the contaminant removal system, which must also be decontaminated.

While existing air cleaning systems are well-suited for removing mist and/or smoke, or for removing vapor, from a contaminated air stream generated by a mechanical industrial process, there is a need for an air cleaning system which can effectively clean a contaminated air stream that includes a hererogenous multi-component mixed density fluid (e.g., mist, vapor and/or smoke) such as the contaminated air streams generated by many mechanical industrial processes. It would also be advantageous to provide an air cleaning system which relied on an operational theory that takes into account a more accurate model of the complex behavior of contaminated air streams that comprise a heterogenous multi-component mixed density fluid.

SUMMARY OF THE INVENTION

An air cleaning system according to the present invention treats contaminated air from a mechanical industrial process containing a heterogeneous multi-component mixed density fluid (e.g., mist, vapor and/or smoke), and addresses the cloud-like behavior of this contaminated air. The air cleaning system continuously captures a contaminated air volume emitted during operation of the mechanical industrial process and mechanically mixes that contaminated air volume with an ambient air volume in order to produce a mixed air volume having certain characteristic temperatures and air velocities. The characteristics of the mixed air volume are controlled such that the mixed air volume does not exhibit cloud-like behavior when transferred via a conduit structure to an air cleaning apparatus or the like.

The present invention recognizes that air volumes will exhibit different characteristics while traveling through an air treatment system, and that certain of those characteristics, such as cloud-like formation and contaminated air volumes having significant gaseous phase vapor components, are undesirable and operate to decrease the overall effectiveness of an air cleaning system, regardless of what type of technology is used for the air cleaning apparatus. Accordingly, the air cleaning system of the present invention is designed in such a way as to reduce the occurrence of cloud-like formations and increase the condensation of any gaseous phase vapor components of the mixed air volume presented to an air cleaning apparatus.

In accordance with the present invention, the mixing of an ambient air volume with a contaminated air volume is controlled so as to decrease and normalize the average energy of the resulting mixed air volume. The ratio of the ambient air volume to contaminated air volume is selected and controlled to be within a range of 5:1 to 100:1, and preferably within a range of 10:1 to 25:1, and a minimum air volume of 250 cubic meters per hour is drawn from each mechanical industrial operation. The specific combination of ambient air volume and mixing velocity is chosen for a particular mechanical industrial operation such that the average temperature of the mixed air volume entering the air cleaning apparatus is not more than 5° centigrade above the temperature of the ambient air volume. The air volume velocity for drawing the contaminated air volume and the ambient air volume into the air cleaning system at each industrial process is chosen to be between about 2.5 and 25.0 cubic meters per second. Preferably, a conduit structure in the air cleaning system that transports the mixed air volume to the air cleaning apparatus is designed to have an effective length and a given air volume velocity so as to provide for an average residence time of the mixed air volume within the conduit structure that is greater than a maximum condensation time of any gaseous phase vapor component of the mixed air volume having a vapor pressure of less than about 10.0 mm/Hg.

Unlike existing air cleaning systems which decrease the volume of air being processed by the system in an attempt to enhance the efficiency of the system, the present invention actually increases the volume of air being processed by the system in order to prevent the air volume from exhibiting cloud-like aerosol bulk motion characteristics. What happens in existing air cleaning systems is that when a cloud formation is captured within the system, the cloud-like formation remains intact all the way to the air cleaning apparatus, and sometimes even through the air cleaning apparatus. This is because the vast majority of the energy internal to the cloud formation is simply unavailable to forces acting around its exterior. To counteract this problem, the present invention utilizes a mechanical structure to mix the contaminated air volume with a larger ambient air volume so as to decrease the cloud-like aerosol bulk motion characteristics of the air volume, thereby preventing the air cleaning apparatus from receiving cloud-like formations en mass. The mechanical mixing structure defines at least one common opening through which both the contaminated air volume and the ambient air volume must pass. The cross sectional area of the common openings to be used for a particular mechanical industrial process is selected such that the cross sectional area is less than or equal to the total of the contaminated air volume and the ambient air volume divided by the air volume velocity (for unit time) for drawing the contaminated air volume and the ambient air volume into the air cleaning system. For the most efficient operation of the air cleaning system, the common openings of the mechanical mixing structure are designed to maximize one length of the common opening for the given cross sectional area so as to define at least one elongated opening having one opening dimension smaller than 2.5 cm.

DETAILED DESCRIPTION OF PREFERRED EMBODIMENTS

Figure 1:
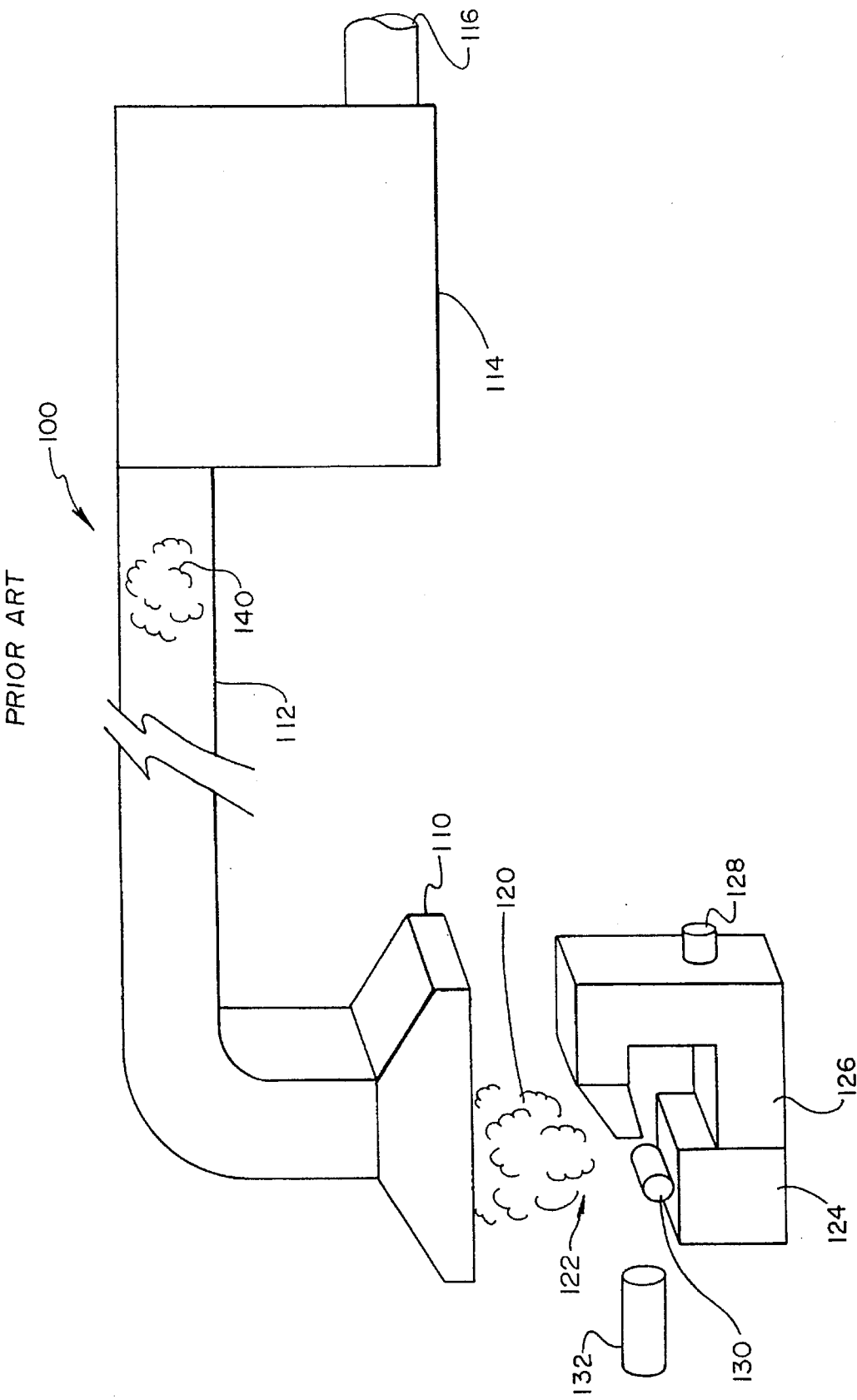
FIG. 1 is an overall block diagram of an existing air cleaning system.

Referring now to FIG. 1, an overall block diagram of an existing air cleaning system will be described. In an existing air cleaning system 100 for use in a mechanical industrial process, such as machining, metal working or material fabrication or the like, a source capture system, such as a hood 110, will be connected by a conduit structure 112 to a mist/particulate removal air cleaning apparatus 114 and provided with a fan and duct 116 to draw contaminated air 120 through air cleaning system 100. Contaminated air 120 is produced at a source 122 within a work area 124 associated with hood 110. In a typical mechanical industrial process, work area 124 would include a material working machine 126 having a motor 128 which provides motive power for the operation of material working machine 126. A work piece 130 located at source 122 and work area 124 is the object of the particular material working process being performed by material working machine 126. During this process it is typical that a coolant transfer device 132 would spray coolant on work piece 130, both for purposes of cooling as well as lubrication during the material working process.

It is contemplated that numerous types of material working machines 126 and work pieces 130 are included within the intended scope of the present invention. Examples of the material working process contemplated by the present invention include drilling, grinding, cutting, sawing, sanding, chipping, forming, planing, joining, and the like. Examples of work pieces 130 which may be the subject of this process include metals, woods, plastics, ceramics, cloth, and the like. While the primary application of the air cleaning system of the present invention is directed to mechanical industrial processes and material work pieces of the type described, it will be recognized that the air cleaning system of the present invention is equally applicable to handling other types of contaminated air streams generated by different processes and work products, particularly when such processes result in contaminated air streams having both a gaseous phase vapor component and liquid and/or solid phase particulate components (i.e., smoke and/or mist) that collectively exhibit cloud-like behavior.

Figure 2:
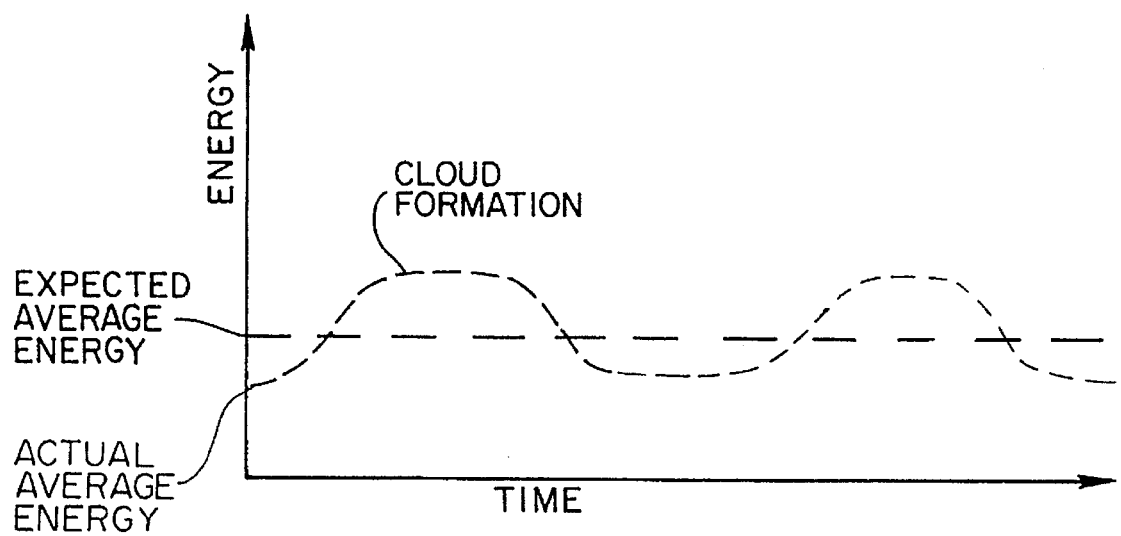
FIG. 2 is a graph of the energy versus time of the contaminated air processed by an air cleaning system as shown in FIG. 1.
Figure 4:
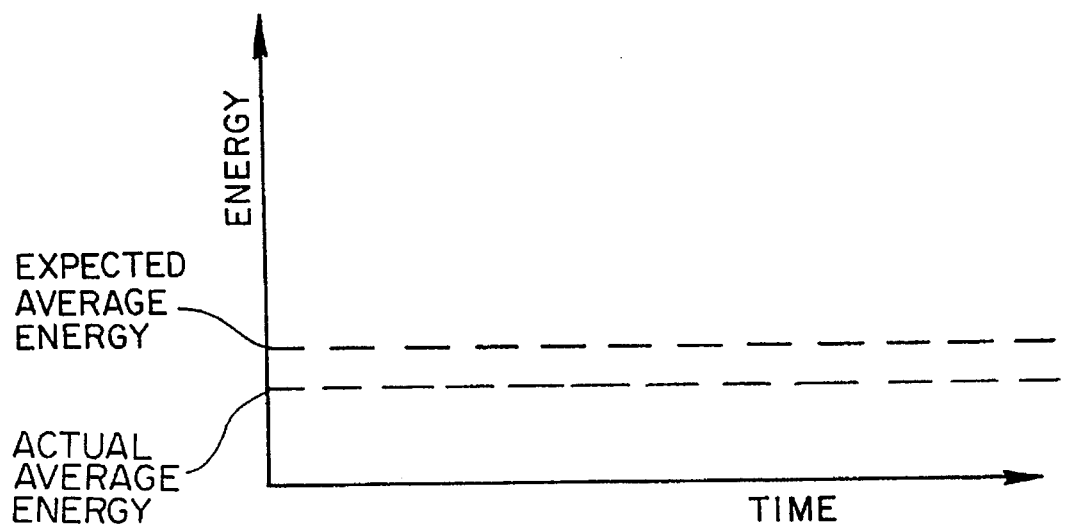
FIG. 4 is a graph of the energy versus time of the contaminated air processed by an air cleaning system of the present invention as shown in FIG. 3.

The problem with existing air cleaning system 100 is that contaminated air generated 120 by the mechanical industrial process at source 122 tends to form a localized cloud of contaminated air directly above source 122. As the structure of hood 110 is designed to provide a large opening directly above source 122, a cloud formation of contaminated air 120 is drawn, in its entirety, within hood 110 and into conduit structure 112. Once within conduit structure 112, this cloud formation 140 travels through conduit structure 112 en mass to arrive at air cleaning apparatus 114 essentially intact. The higher energy of cloud formation 140 in the form of higher temperatures and vapor pressures can overwhelm air cleaning apparatus 114 such that significant portions of contaminated air 120 pass through air cleaning apparatus 114 without being effectively treated.

Normally, clouds having a diameter on the order of less than ten meters, for example, are generally presumed to be unstable and are assumed to break up and deteriorate rather quickly. Unfortunately, and quite unexpectedly, this general assumption does not hold true when processing contaminated air streams from mechanical industrial processes, for several reasons. First, the makeup and characteristics of cloud formation 140 are significantly more cohesive than, for example, a naturally-occurring cloud of similar dimensions. This is particularly due to the heat generated by motor 128 and the nature and quality of liquid coolant used in the mechanical industrial process. Second, cloud formation 140, once within hood 110 and conduit structure 112, tends to remain intact because there are relatively fewer forces that can significantly act upon the cloud formation within conduit structure 112, for example, than if a similar cloud formation were in the ambient air. Finally, the nature of cloud formations themselves are such that the behavior of cloud formation is difficult to predict, even in the relatively confined situation of an air cleaning system. As Professor William C. Heinz indicates in his book, *Aerosol Technology, Property, Behavior and Measurement Airborne Particles*, "[t]he mechanics of clouds are more complicated than that for individual particles, and a complete description [of cloud behavior] does not exist." (Chapter 17, p. 347).

As shown in FIG. 2, the end result is that air cleaning apparatus 114 tends to receive contaminated air 120 with such cloud formations 140 still intact. With the average energy of a cloud formation 140, as determined by temperature and vapor pressure characteristics ($T_c$ and $\rho_c$), being substantially greater than the average energy, as determined by temperature and vapor pressure characteristic ($T_e$ and $\rho_e$), expected for contaminated air stream 120, it is difficult enough for any type of air cleaning apparatus 114 to remove the non-gaseous phase components of such a cloud formation, let alone address the various gaseous phase vapor components which may be present within cloud formation 140. By removing the solid and/or liquid phase components from contaminated air stream 120, air cleaning apparatus 114 will decrease the vapor pressure ($\rho_c$ or $\rho_e$) of contaminated air stream 120 within air cleaning apparatus 114. While a decrease in the vapor pressure ($\rho_e$) may help to reduce the gaseous phase vapor component, it has been found that any decrease in the vapor pressure ($\rho_c$) of cloud formation 140 is, by itself, insufficient to compensate for the increased energy as measured by the temperature ($T_c$) of cloud formation 140. As a result, there is no significant reduction of the gaseous vapor component of a cloud formation 140 during processing by air cleaning apparatus 114 and the "clean" air exhausted from the system will still contain significant amounts of gaseous phase vapor components.

In contrast to air cleaning systems 100 in the prior art, embodiments of the present invention recognize that because a cloud contains its own energy and because that energy is generally inaccessible to the air stream, particularly in the situation when the cloud formation is within a conduit structure, an air cleaning system must include a mechanism to prevent such cloud formations from operating within the air cleaning system. Preferably, the prevention of cloud formations is accomplished at the point at which the contaminated air enters the air cleaning system. Alternatively, mechanisms can be constructed within the air cleaning system to break up any cloud formations that have entered the conduit structure of an air cleaning system.

To accomplish this objective, embodiments of the present invention actually add an ambient air volume to the contaminated air volume to increase the total air volume which must be processed by the air cleaning system. This approach is in stark contrast to the generally accepted theory that the amount of air to be treated by an air cleaning system should be minimized. The ambient air volume is mixed with the contaminated air volume so as to produce a mixed air volume, and the mixed air volume is generally prevented from exhibiting cloud-like aerosol bulk motion characteristics. Although the contaminated air volume can be thought of as a cloud, the cloud of contaminated air actually comprises a heterogenous multi-component mixed density fluid. Like any cloud, the heterogeneous multi-component mixed fluid that is treated by the present invention can consist of a first gas component of a lower density (e.g., air) and a second gas component of a higher density (e.g., an oil vapor), a first gas component (e.g., air) and a liquid component (e.g., mist droplets), or a first gas component (e.g., air) and a solid component (e.g., smoke or fine particulates suspended in the air); or the heterogenous mixed density fluid could be comprised of any combination or variation of these combinations.

Referring now to FIG. 3, a preferred embodiment of the present invention will be described. As with FIG. 1, a mechanical industrial process generates a contaminated air volume 120 using a material working machine 126 having a motor 128 and a work area 124 with a work piece 130, to form a source 122 of the contaminated air volume 120. Coolant source 132 typically supplies coolant during the mechanical industrial process. Air cleaning system 150 in accordance with the present invention includes a source capture system 152, a conduit structure 154, an air cleaning apparatus 156, an air movement mechanism including duct 158, and a mixing mechanism 160. In FIG. 3, two embodiments of mixing mechanism, 160, 160', are shown. Unlike hood 110 in the prior art, in a first embodiment, source capture system 152 is provided with mechanical mixing structure 160 for mixing contaminated air 120 with an ambient air volume 171 at the intake to source capture system 152. In a second embodiment, conduit structure 154 may be provided with an in-line mixing structure 160' that adds an ambient air volume 173 drawn into air cleaning system 150 at a location other than source capture system 152. In either case, contaminated air volume 120 and ambient air volumes 171 and/or 173 are effectively mixed to form a mixed air volume 180 which then enters air cleaning apparatus 156. As clearly shown in e.g. FIG. 3, ambient air volumes 171, 173 are obtained from a source or sources that are each different than source 122 of contaminated air volume 120. Ambient air volume 171, for example, may be drawn from ambient air surrounding work area 124 if drawn from an orientation that is different than an orientation directed toward source 122. Alternatively, ambient air volume 173 may be drawn from a location other than work area 124, including from a location remote from or external to work area 124.

The details of the preferred embodiments of mixing structure 160 and 160' are described in connection with FIGS. 6–9 and 10, respectively. The important characteristics of mixing mechanism 160 and/or 160', however, are more accurately determined by the resulting characteristics of mixed air volume, rather than by the structure or mechanism used to accomplish the mixing. The mixing of an ambient air volume with a contaminated air volume by mixing mechanism 160 and/or 160' is controlled so that the ratio of the ambient air volume to contaminated air volume is selected and controlled to be within a range of 5:1 to 100:1, and preferably within a range of 10:1 to 25:1. A minimum air volume of 250 cubic meters per hour is drawn from each work area 124 using a linear mixing velocity generated by the air movement mechanism via duct 158 and measured at mixing mechanism 160 of between about 2.5 and 25.0 meters per second. The specific combination of ambient air volume and mixing velocity is chosen for a particular mechanical industrial operation such that the average temperature of mixed air volume 180 entering air cleaning apparatus 156 is not more than 5° centigrade above the temperature of ambient air volumes 171, 173. Preferably, conduit structure 154 has an effective length 184 and a given air volume velocity 186 so as to provide for an average residence time of mixed air volume 180 within conduit structure 154 that is greater than a maximum condensation time of any gaseous phase vapor component of mixed air volume 180 having a vapor pressure of less than about 10.0 mm/Hg.

It will be apparent that numerous variations and arrangements to the principal elements of air cleaning system 150 can be made within the scope of the present invention. For example, in a factory where there are multiple work areas 124, each source capture system 152 could be connected by smaller branch conduit to a larger common plenum, one end of which would be connected to air cleaning apparatus 156. In this situation, it is preferable that the linear air velocity in the branch conduit be about twice that within the common plenum. The air cleaning apparatus can comprise any mist/smoke removal apparatus that is capable of efficiently removing liquid or sold phase particulate components from an air stream, such as helical separators, cyclone separators, scrubbers, activated charcoal beds, mechanical and electrical filters and the like, or any combination thereof.

As shown in FIGS. 11–13, air cleaning apparatus 156 preferably is comprised of a plurality of vertically-oriented separation tubes 190, each separation tube including a plurality of helical elements 192 longitudinally disposed within the separation tube, each helical element being offset in orientation with respect to any adjacent helical elements. Tubes 190 are disposed within helical filter unit 191, which includes contaminated air intake 193. Downstream from these helical separation tubes 190 are one or more HEPA filters (shown in an extended position in FIG. 13, for clarity) in HEPA filter unit 195, followed by a squirrel cage fan unit 196 that comprises an air movement mechanism including duct 158. While a backward-inclined squirrel cage fan unit is preferred for drawing mixed air volume 180 through conduit structure 154, it will be recognized that any other type of equivalent fan unit such as a forward inclined fan could also be utilized. In the preferred embodiment, the helical separation tubes 190, HEPA filters 194, and fan unit 196 are each modular units constructed in accordance with the disclosure of the previously referenced co-pending application Ser. No. 08/409,828, entitled "MODULAR AIR CLEANING SYSTEM".

As shown in FIG. 4, the important characteristics that result from the inclusion of mixing mechanism 160 and/or 160' within air cleaning system 150 are that ambient air volume 171, 173 is mixed with contaminated air volume 120 so as to achieve an average energy, as determined by temperature ($T_a$), of the mixed air volume 180 that is not more than about 5° C. above a temperature of the ambient air volume 171, 173. As can be seen by comparison to FIG. 2, the average energy of mixed air volume 180, as determined by temperature ($T_a$) measured just prior to entering air cleaning apparatus 156, does not fluctuate wildly as in the prior art air cleaning systems 100. Moreover, the vapor pressure ($\rho_a$) is also significantly less than either of the vapor pressures ($\rho_c$ or $\rho_e$) in the prior art cleaning systems 100. This decrease in vapor pressure is a function of both the decrease in average temperature ($T_a$) and the establishment of a minimum residence time within conduit structure 154. The net result is that there is a significant reduction in the gaseous phase vapor components of any air stream exhausted from air cleaning system 150 because such gaseous phase vapor components have been condensed to mist and/or droplets by air cleaning system 150 before entry into air cleaning apparatus 156, where the mist and/or droplets can be removed from the air stream.

The ability to completely directly test the effectiveness of air cleaning system 150 is somewhat difficult because there are no completely accurate techniques for modeling or effectively measuring the average energy of a cloud formation. One indirect test which has been developed for determining whether air cleaning system 150 was successful over a long period of operation in preventing cloud-like aerosol bulk motion behavior of mixed air volume 180 is to determine whether, in the preferred embodiment of the air cleaning apparatus, the HEPA filter unit was capable of sustained operation at no more than about 3.0–3.5 inches pressure drop across the HEPA filter unit for more 4000 hours. If air cleaning system 150 is not capable of running for this amount of time without replacing the individual HEPA filters in the HEPA filter unit, then some significant amount of gaseous vapor phase components are passing through the helical separation unit, which would otherwise extract greater than 99.99% of all liquid or solid phase particulates of greater than 1 micron in diameter.

Referring to FIG. 5, it can be seen that the ratio of ambient air volume to contaminated air volume is a function of the maximum vapor pressure of any liquid coolant or other vaporized contaminant used in the mechanical industrial process. In FIG. 5, the function is represented on a log-log chart and the bold center line indicates the more efficient ratios for a given vapor pressure, with the outer lines indicating a preferred range of air ratios for a given vapor pressure. By utilizing the mixing mechanism 160 and/or 160' of the present invention, it is possible to effectively introduce mixed air ratios of 100:1 ambient air volume:contaminated air volume. This allows air cleaning system 150 to effectively remove vaporized gaseous phase contaminates up to as high as about 10 mm/Hg. When air cleaning system 150 is used, for example, with the Heli-Flo® air cleaning apparatus as air cleaning apparatus 156, it is possible to remove 99.9% of all contaminants from such a contaminated air volume. For higher vapor pressure contaminants, the effectiveness of the present invention is correspondingly decreased.

Preferably, the mixing operation accomplished by mixing mechanism 160 of the present invention prevents the formation of clouds as small as 1 cm in diameter. It is also preferable that the ambient air added in the mixing operation be as cold as possible to further facilitate the mixing and condensation process. If, for example, air cleaning system 150 is indoors, it would be possible to draw ambient air from outside (particularly in colder climates and winter months) to increase the efficiency of the mixing operation of the present invention. Alternatively, it would be possible to refrigerate the ambient air, for example, prior to the mixing operation. Preferably, the mixing operation occurs relatively close to source 122 of contaminated air 120 so as to maximize the duration during which condensation of any gaseous phase vapor components can occur.

It is also preferable to capture contaminated air 120 relatively close to source 122 to maximize the effectiveness of the source capture system 152. Typical cloud formations will have natural rise/expansion rates on the order of 80–130 ft/m and will generally expand upward from a point source in the form of a 30 degree cone in the absence of any significant cross ventilation over the work area. These factors contribute to the added benefit of locating source capture system 152, as well as mixing mechanism 160 and/or 160', as close as feasible to source 122 of contaminated air volume 120.

It will be appreciated that air cleaning system 150 in accordance with the present invention can be optimally configured to meet the specific needs of a wide variety of mechanical industrial processes. In general, the desired airflow volume for air cleaning system 150 to properly handle contaminated air from a work area 124 can be estimated according to the following formula:

$$Vol_{hp}=30*C_t*(1+(P_c*(P-100)))$$

where $Vol_{hp}$ is the desired airflow volume in cubic feet per minute per horsepower (cfm/hp) for a motor 128 for work area 124, $C_t$ is a coolant factor depending upon the type of coolant (synthetic equals 1.0, water soluble equals 0.9, mineral oil base equals 1.5), $P_c$ is a coolant pressure constant (0.00054) and P is the coolant pressure of the coolant from coolant source 132 in pounds per square inch (psi). In the event that the horsepower of motor 128 is greater than 30 hp, $Vol_{hp}$ should be increased by 50%. In the event that the motor 128 is within an enclosure associated with work area 124, $Vol_{hp}$ should be increased by 33%. For example, if a 25 hp motor powers a grinding operation that uses a mineral oil based coolant supplied at 500 psi, the total volume of mixed air 180 which should be drawn for this operation would be 25 hp*((30*1.5*(1+(0.00054*(500–100)))*1.5), equals 25 hp*82 cfm/hp, for a total of about 2050 cfm, or 3375 cmh (cubic meters per hour). If the 25 hp motor were contained within an enclosure for the grinding operation, this total should be increased by 33% to about 2725 cfm, or 4500 cmh.

Referring now to FIGS. 6–10, alternative preferred embodiments of mixing mechanism 160, 160' will now be described.

In a first embodiment of mixing mechanism 160 as shown in FIG. 6, source capture system 152 is comprised of a hood 164, a central baffle 166, and a peripheral capture slot 168. The lower margins of the hood 164 extend substantially outward from a location over the work piece 130 in order to capture virtually all of the contaminated air volume 120 that is generated in the work area 124.

Central baffle 166 is relatively large and is disposed within the hood 164 approximate the lower margin thereof. Central baffle 166 preferably is formed of a solid sheet of metal to present a substantially impervious surface to the contaminated air volume 120.

Peripheral capture slot 168 is defined between the outer margin of the central baffle 166 and the lower margin of the hood 164. In a preferred embodiment, the capture slot 168 has a width dimension that is between 1 and 2.5 centimeters. Capture slot 168 is positioned so as to be able to draw both contaminated air volume 120 and ambient air volume 171.

Alternatively, the ambient air is mixed with the contaminated air volume 120 by being admitted to mechanical mixing structure 160', which includes an ambient air intake. It is important that mixing of ambient air with the contaminated air volume 120 occur as close as possible to the work area 124. Accordingly, the ambient air intake of mechanical mixing structure 160' is located proximate to source capture system 152.

Figure 7:
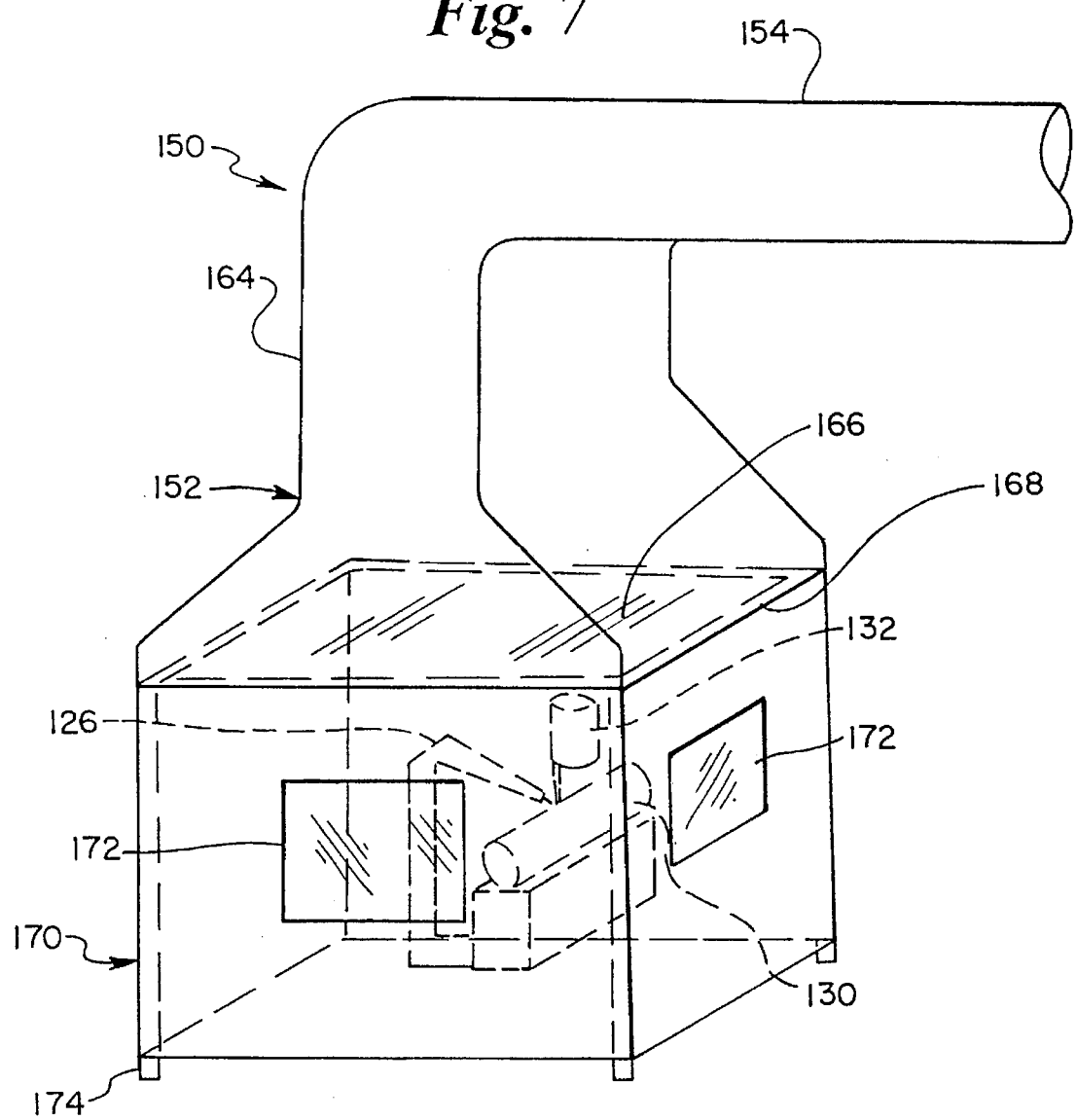
FIG. 7 is a perspective view of a non-air-tight container unit version of a source capture embodiment of a mixing mechanism according to the present invention.

Certain mechanical industrial operations are conducted within an enclosure. Referring to FIG. 7, the source capture system 152 of the present invention is utilized with a work station enclosure 170. The work station enclosure 170 is generally rectangular in shape and substantially encloses the work piece 130, the material working machine 126, and the coolant source 132. Work station enclosure 170 in FIG. 10 may be termed a leaky enclosure in that openings 172 are defined in the sides thereof. The openings 172 are generally used to view the mechanical industrial operation and may also be used to position the work piece 130 in place.

Additionally, the work station enclosure 170 is mounted on legs 174. Such mounting defines an opening between the bottom margin of the work station enclosure 170 and the air flow of the factory or other surrounding location.

Hood 164 of the source capture system 152 is substantially co-extensive with the top margin of the work station enclosure 170. Central baffle 166 is suspended within the hood 164 and is preferably coplanar with the top margin of the work station enclosure 170. Peripheral capture slot 168 is defined between the margin of the central baffle 166 and the lower margin of the hood 164.

The source capture system 152 is fluidly coupled to conduit structure 154. The conduit structure 154 is in turn fluidly coupled to a mist/particulate separator and fan unit (not shown), as previously described.

Figure 8:
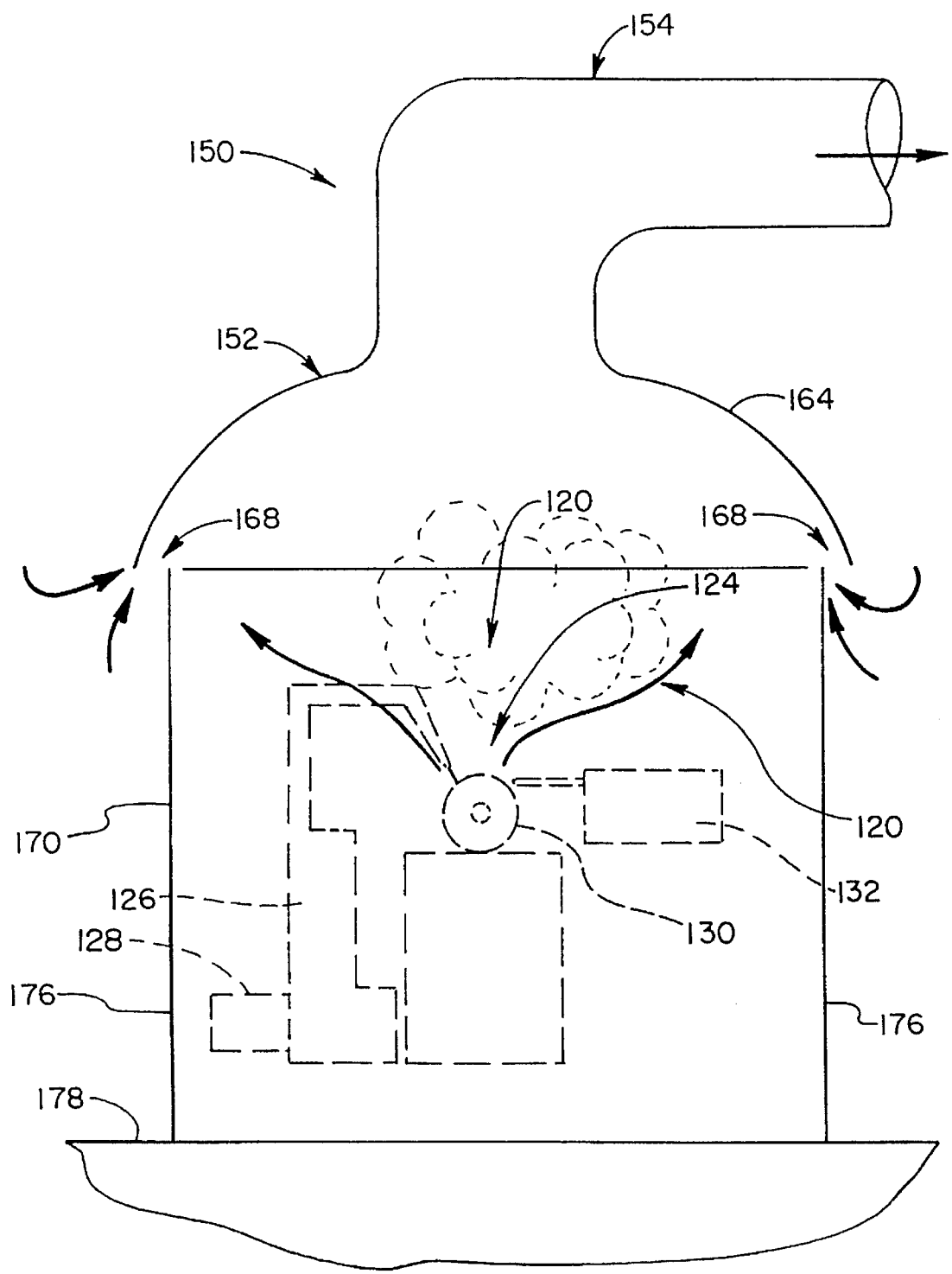
FIG. 8 is a cross-sectional schematic diagram of an air-tight containment unit version of a source capture embodiment of a mixing mechanism according to the present invention.

Referring now to FIG. 8, the air cleaning system 150 is depicted utilized with a work station enclosure 170 that can be described as a being a tight enclosure as distinct from the leaky work station enclosure 170 of FIG. 7. The tight work station enclosure 170 is substantially sealed. Accordingly, the walls 176 of the work station enclosure 170 adjoin the factory floor 178 and all openings 172, such as described in reference to FIG. 7, are included. Any such opening 172 providing either viewing or access is sealed and may have a transparent panel to facilitate viewing.

In the embodiment depicted in FIG. 8, the lower margin of hood 164 of the source capture system 152 resides outside the upper margin of the work station enclosure 170. The margin of the central baffle 166 resides inside the inside margin of the top of the enclosure 170. Accordingly, the peripheral capture slot 168 overlaps the top margin of the enclosure 170 with a portion of such capture slot 168 open to the ambient air and a second portion of the capture slot 168 open to the contaminated air 120 within the enclosure 170.

Figure 9:
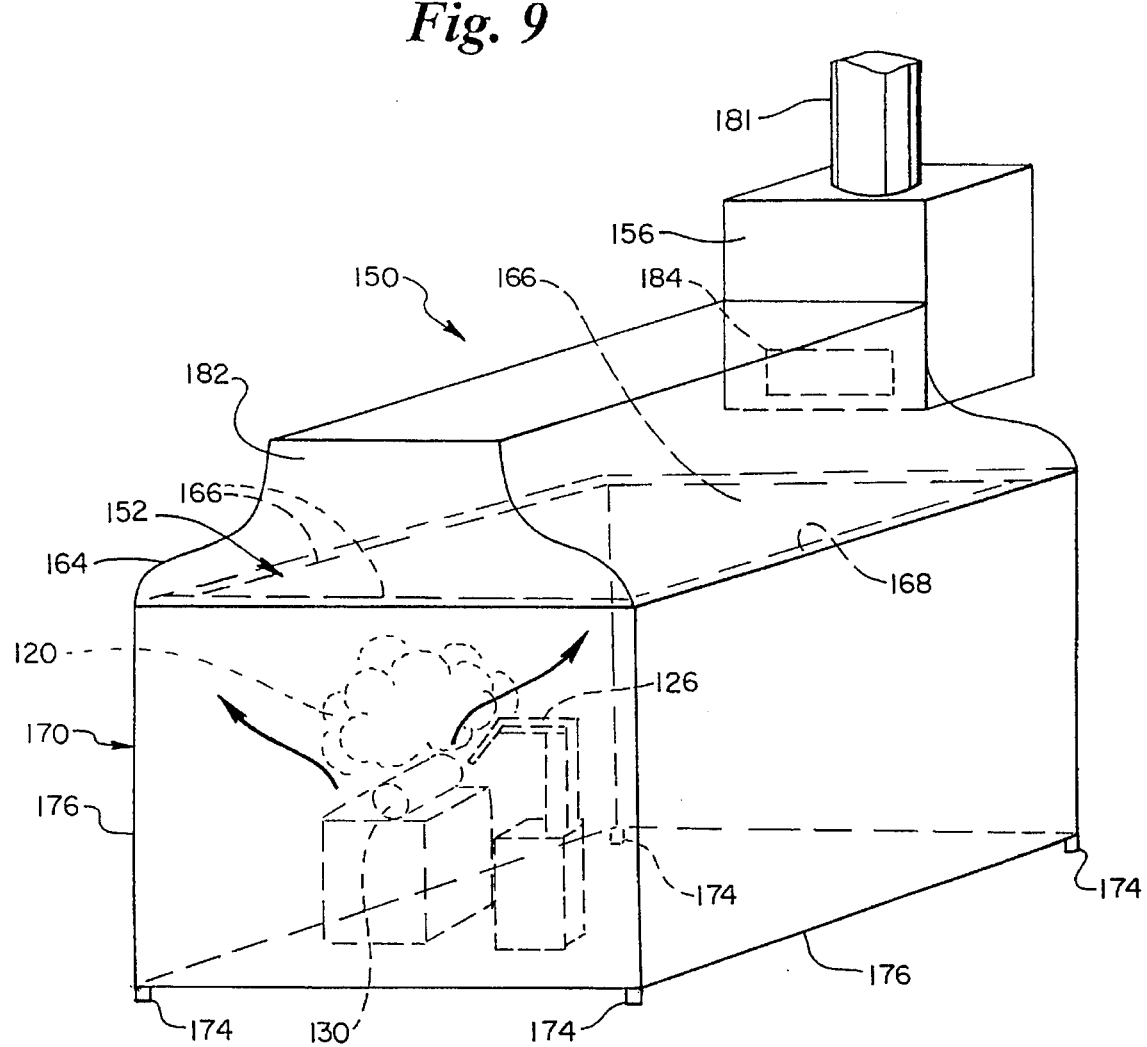
FIG. 9 is an overall perspective schematic view of a retrofit plenum version of an air-tight containment unit version of a source capture embodiment of a mixing mechanism according to the present invention.

An air cleaning system 150 of the present invention that is designed to be retrofitted with a material working machine 126 that is presently installed in the factory floor is depicted in FIG. 9. In such retrofit situations, the available space in which to install the air cleaning system 150 may be severely restricted. Accordingly, it is desirable that the air cleaning system 150 be as compact as possible.

Work station enclosure 170 depicted in FIG. 9 is of the leaky type, being mounted on legs 174 and having an air passageway defined between the bottom margin of the walls 176 of the work station enclosure 170 and the floor of the factory.

Figure 3:
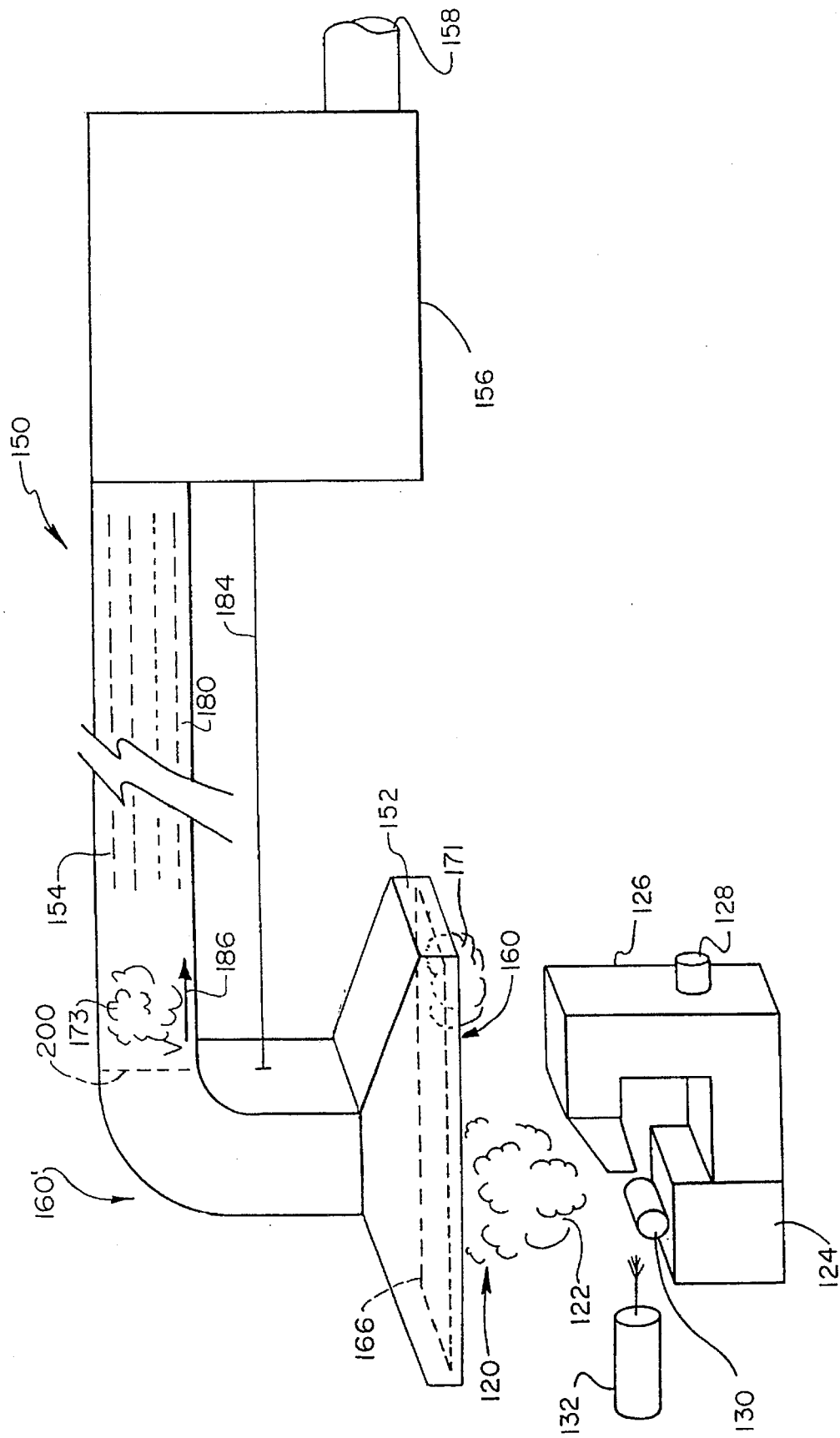
FIG. 3 is an overall block diagram of an air cleaning system in accordance with the present invention.
Figure 5:
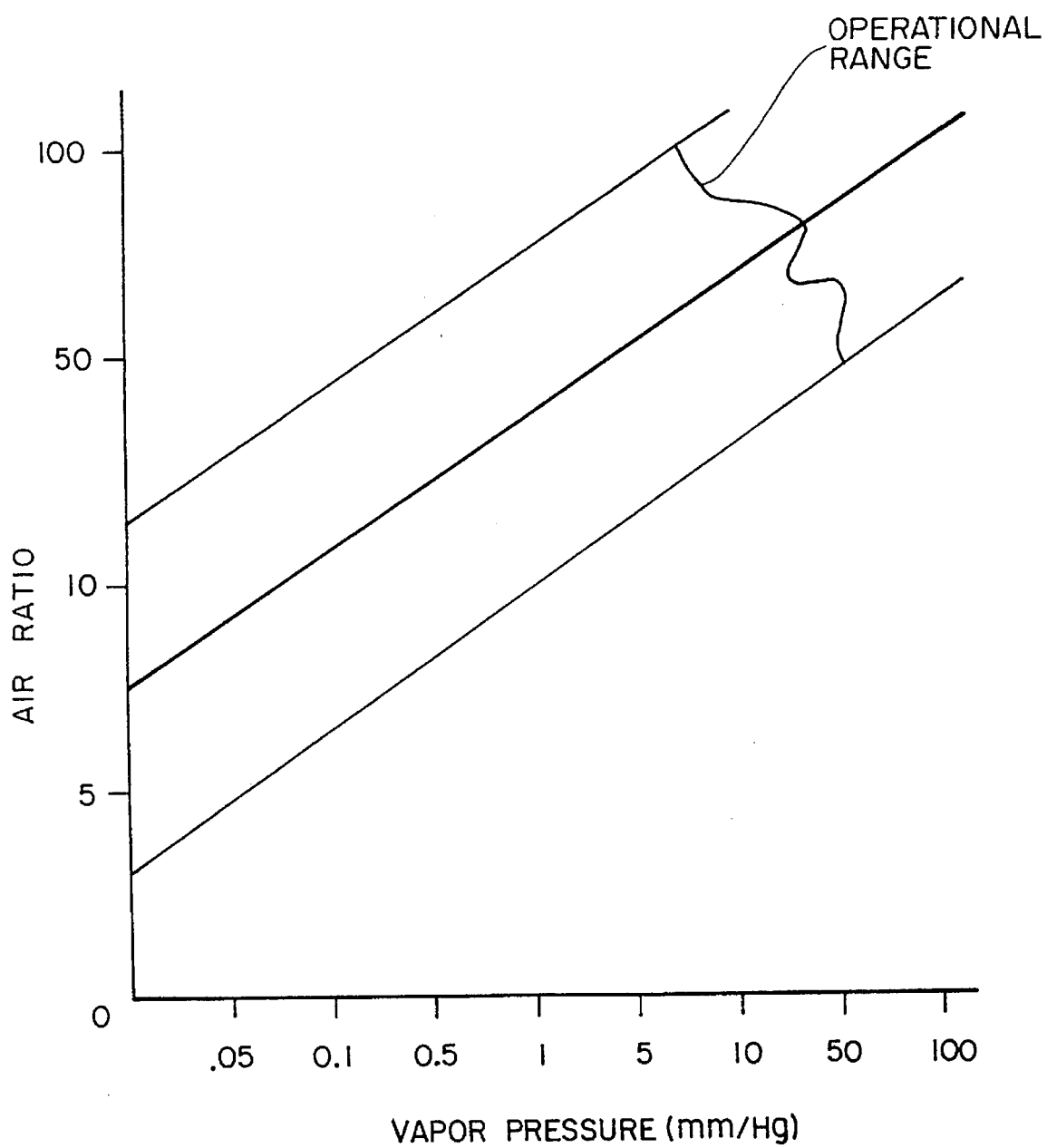
FIG. 5 is a graph of mixing ratios versus vapor pressure of the contaminated air volume.
Figure 6:
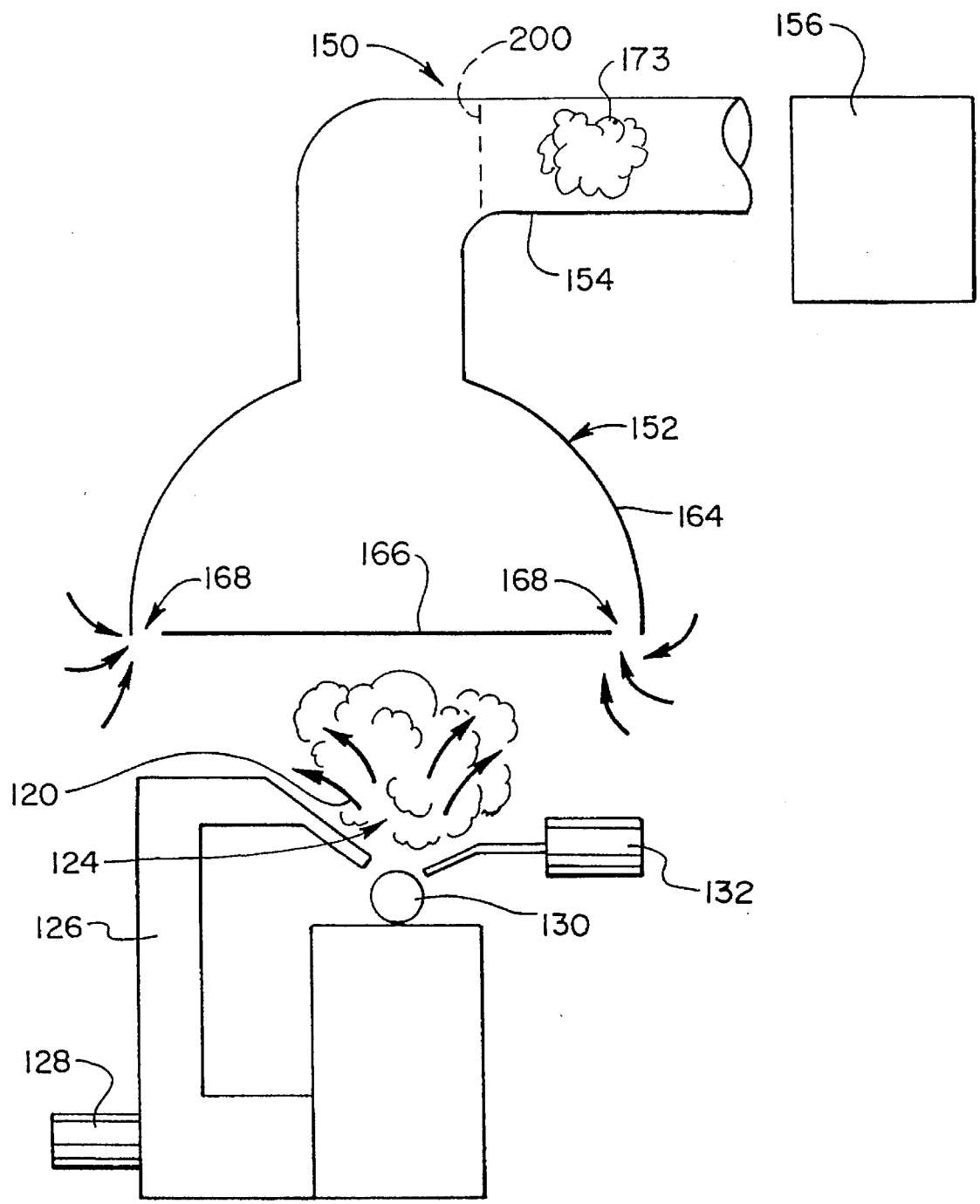
FIG. 6 is a cross-sectional schematic diagram of a hood arrangement version of a source capture embodiment of a mixing mechanism according to the present invention.

The hood 164, central baffle 166, and capture slot 168 of the source capture system 152 are configured substantially as indicated in the description of FIG. 7. A large volume plenum 182 is fluidly coupled to the hood 164. The mist/particulate separator 156 and fan with duct 158 (FIG. 3) are connected to the plenum 182. An air passageway 184 accommodates the flow of contaminated air 120 from the plenum 182 to the unit containing the mist/particulate separator 156 and fan with duct 158. An exhaust duct 181 is provided to exhaust the cleansed air from such unit.

In operation, the air cleaning system is designed to handle a vapor generated by a mechanical industrial process. For example, in a steel or aluminum mill, 500 gallons per minute of coolant is sprayed on steel or aluminum at 700° F. Such activity results in evaporation. There are two approaches to preventing cloud-like behavior of the resulting contaminated air volume. The first is to decrease the concentration and the second is to decrease the temperature thereof. A means of accomplishing both approaches is to mechanically mix the relatively warm contaminated air 120 with cooler ambient air, to break up the contaminated air cloud and decrease temperature.

In order to break up the cloud by mixing the cooler ambient air, the peripheral capture slot 168 preferably has a long dimension extending around the full periphery of the hood 164. The second dimension of the capture slot 168 is kept relatively small, being preferably in the one to three centimeter range. By keeping this second dimension of the capture slot 168 relatively small, necessary turbulence is developed at the capture slot 168 to stir up and dissipate the cloud.

It is also desirable to provide the cooling of the cloud as close as possible to the source of contaminant. Additionally, as depicted in FIGS. 7 and 9, bringing ambient air beneath the material working machine 126 tends to stabilize the temperature of the material working machine 126, resulting in increased tool life. Preferably, the temperature of the mixed ambient air and contaminated air volume 120 is less than 5° C. greater than the temperature of the ambient air.

It is important to fully contain the flow of contaminated air volume 120, such that there is an equilibrium perimeter flow through the capture slot 208. To ensure the state of the equilibrium perimeter flow, the velocity in the conduit structure 154 and the plenum 182 is approximately one half the velocity of the mixed ambient air and contaminated air volume 120 through the capture slot 168. The velocity in the capture slot is preferably in 2000 to 4000 feet per minute range. A much greater velocity requires too much fan energy to generate the flow.

In operation, the fan via duct 158 generates a negative pressure in the conduit structure 154 in the source capture system 152. This negative pressure extends throughout the length and width of the capture slot 168, resulting in the capture of the contaminated air volume 120 and the admission of a substantial volume of ambient air. The vigorous mixing of the cool ambient air with the warm cloud-like contaminated air volume 120 at the capture slot 168 causes breakup of the cloud-like contaminated air volume 120. The vapor contained within the cloud-like contaminated air volume 120 becomes a mist, which is readily handled by the mist/particulate separator 156.

For a more detailed description of the first embodiment of the mixing mechanism 160 of the present invention, reference is made to previously identified co-pending application Ser. No. 08/413,202, entitled "SOURCE CAPTURE SYSTEM FOR AN AIR CLEANING SYSTEM".

Figure 10:
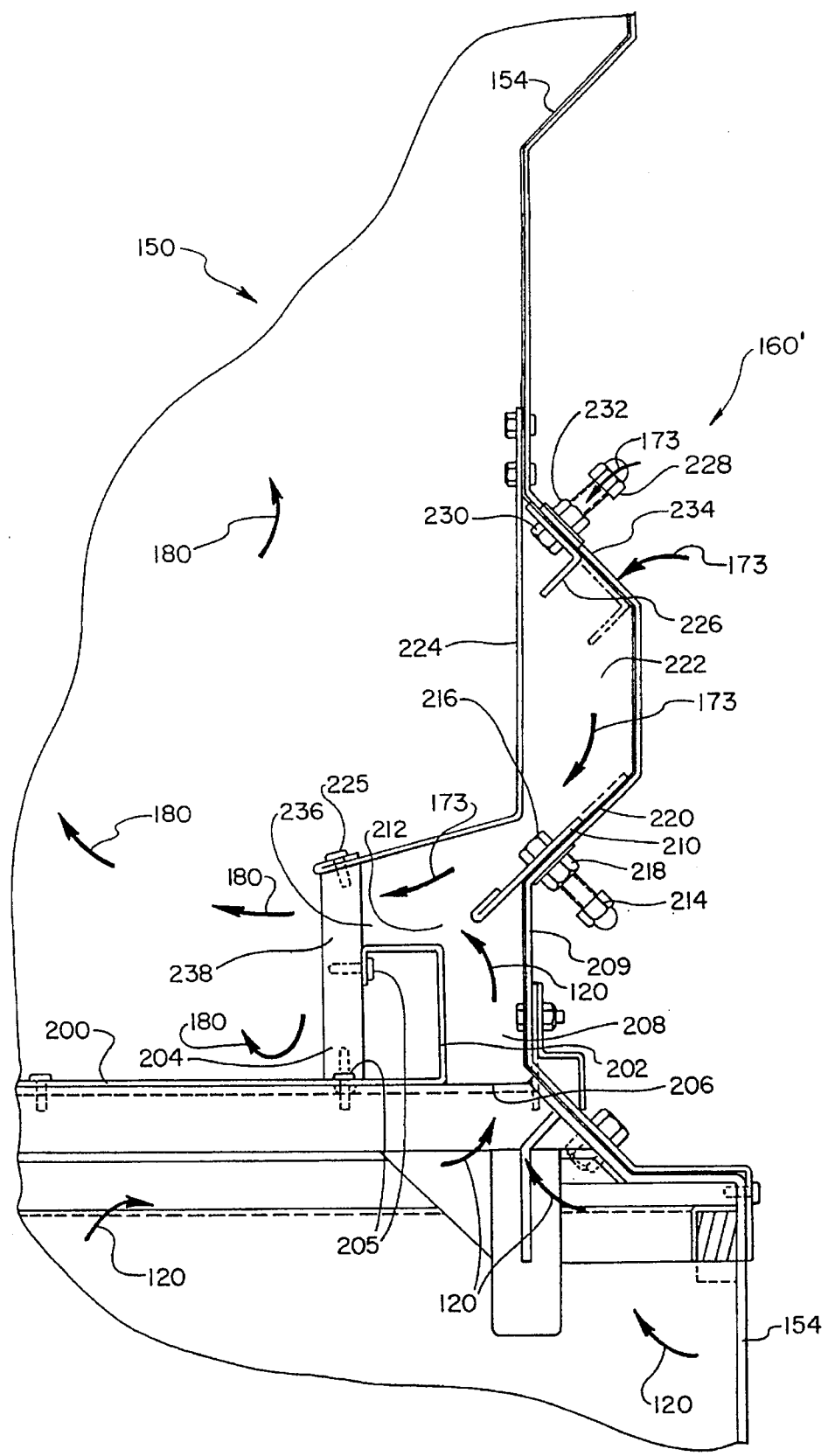
FIG. 10 is a cross-sectional schematic diagram of an in-line conduit embodiment of a mixing mechanism according to the present invention.
Figure 11:
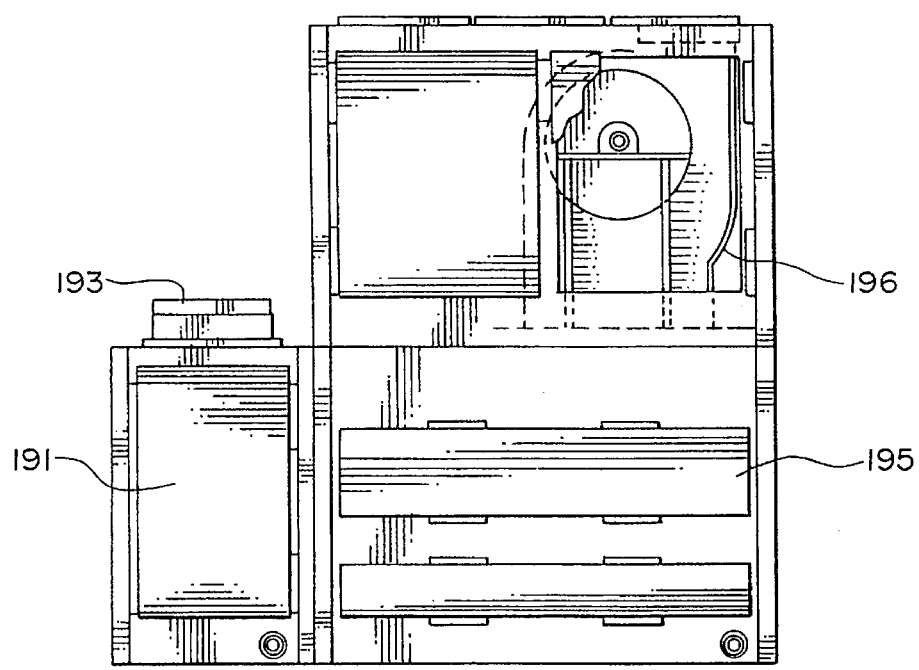
FIG. 11 is a front view of a modular air cleaning system with a broken-away portion, according to an embodiment of the invention.
Figure 12:
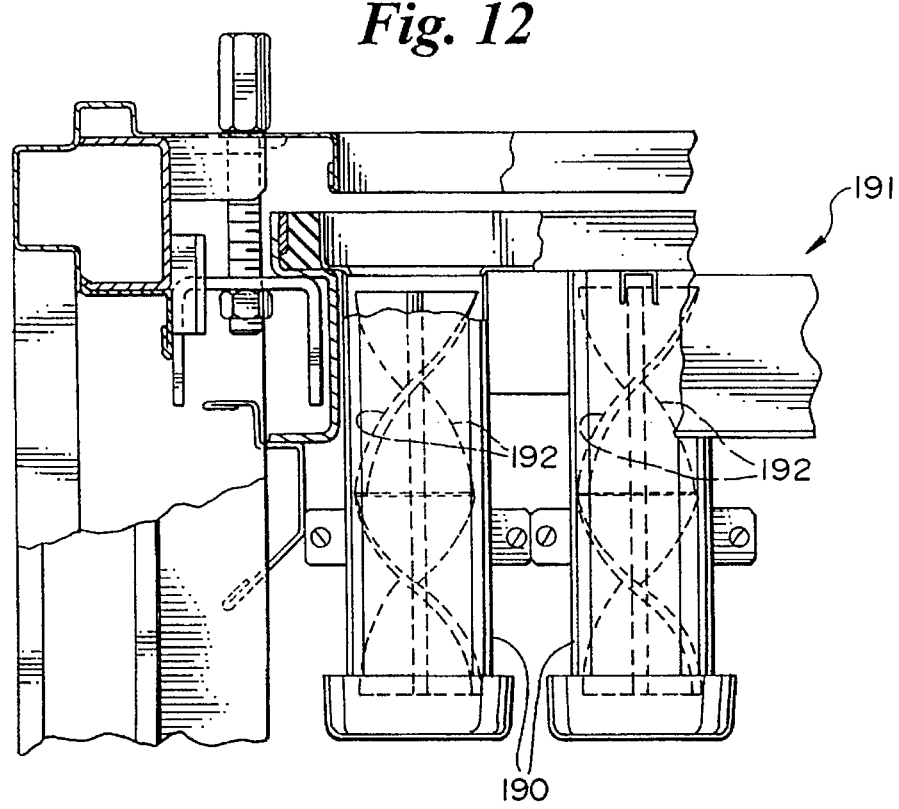
FIG. 12 is a front view of a portion of a helical filter unit according to an embodiment of the invention.
Figure 13:
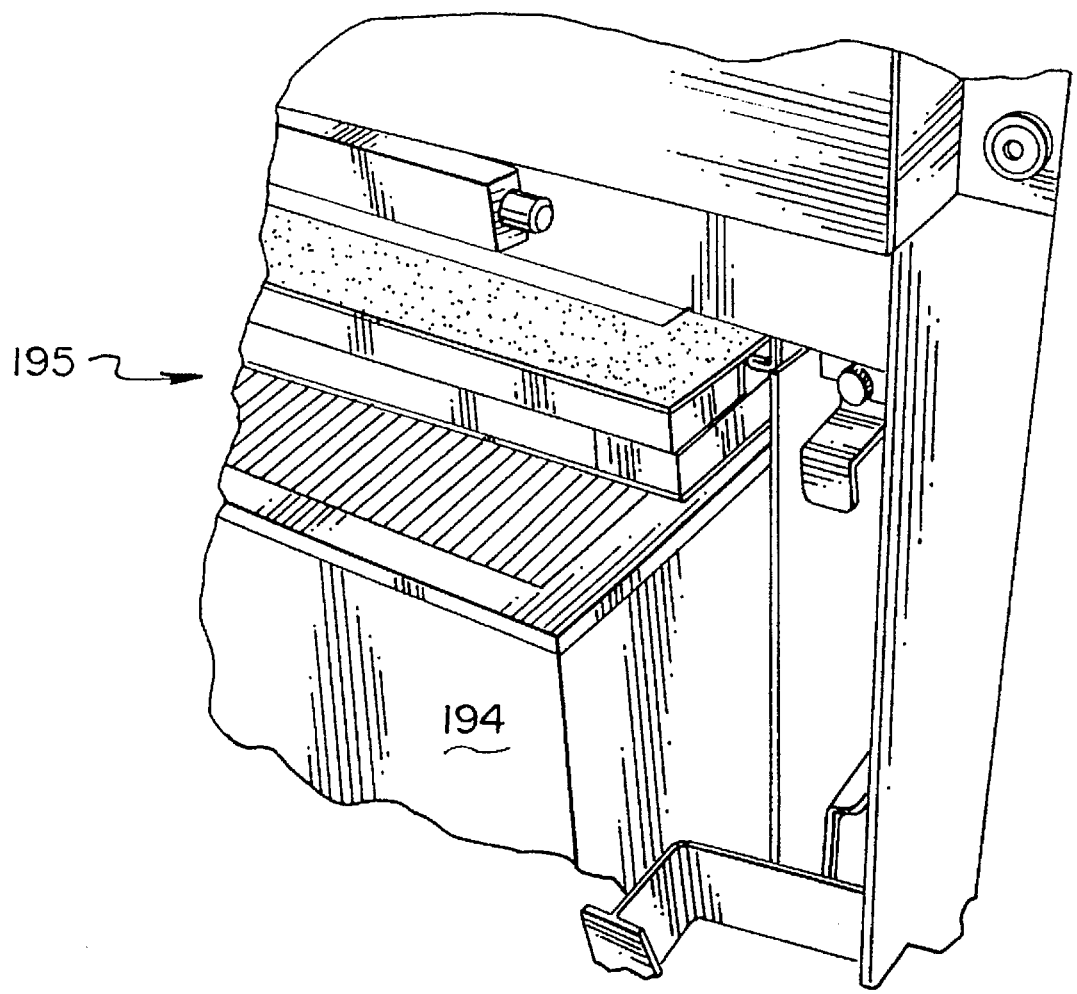
FIG. 13 is a perspective view of a HEPA filter unit with a HEPA filter partially removed, according to the invention.

FIG. 10 depicts inline mixing structure 160' of air cleaning system 150 that is installed in conduit structure 154. Such installation may occur when a conduit structure 154 is initially constructed or it may occur by removing an existing section of conduit structure 154 and replacing such removed section with the inline mixing structure 160'.

The structure depicted in FIG. 10 is a peripheral structure that effectively forms a structure at the outer periphery of all four sides of a rectangular shaped conduit structure 154. The effect of the inline mixing structure 160' is to interpose a solid baffle restrictor plate 200 across the cross sectional dimension of conduit structure 154. The restrictor plate 200 is rectangular in shape having exterior dimensions that are slightly less than the interior dimensions of conduit structure 154. Accordingly, a peripheral contaminated air inlet 206 is defined at all four edge margins of the restrictor plate 200. The length of such peripheral contaminated air inlet 206 is substantially equal to the perimeter dimension of the restrictor plate 200. The width dimension of the peripheral contaminated air inlet 206 is substantially less, being preferably approximately 2.5 centimeters.

The restrictor plate 200 has an interior channel wall 202 defined at the periphery thereof. Interior channel wall 202 is supported by a channel wall brace 204 affixed to the restrictor plate 200 and the interior channel wall 202 by machine screws 205.

The peripheral contaminated air inlet 206 is fluidly coupled to a contaminated air channel 208 that is formed between the interior channel wall 202 and the exterior channel wall 209.

A selectively positionable inlet volume control 210 is positioned at the exit of the contaminated air channel 208 and defines a throat 212 between a margin of the inlet volume control 210 and the interior channel wall 202. The area of the throat 212 is variable by adjusting the inlet volume control 210.

The inlet volume control 210 is a plate that is affixed to the inner side of the exterior channel wall 209 by a bolt 214. The bolt 214 is driven into nut 216 that is affixed to the inlet volume control 210. A lock nut 218 is positioned from the exterior side of exterior channel wall 209 on bolt 214. The bolt 214 is mounted in a slot 220 formed in the exterior channel wall 209. Positioning bolt 214 within the slot 220 slides the inlet volume control in or out to affect the size of the throat 212.

An ambient air channel 222 is formed between the inner ambient air channel wall 224 and exterior channel wall 209. The inner ambient air channel wall 224 is supported at one end by channel wall brace 204 and is affixed thereto by machine screw 225. An inlet volume control 226 is affixed to the inner side of exterior channel wall 209. The inlet volume control 226 is positionable by bolt 228 slidingly engaged in a slot 234. The bolt 228 is held in position by the nut 230 and lock nut 232. Translation of the inlet volume control 226 within slot 234 acts to vary the exposed area of an aperture (not shown) defined in the exterior channel wall 209. Such variation effectively controls the ambient air volume 173 entering the ambient air channel 222.

The contaminated air channel 208 and the ambient air channel 222 converge in a mixing channel 236. The mixing channel 236 is defined between the inner ambient air channel wall 224 and the interior channel wall 202. The mixed air volume 180 in the mixing channel 236 is exhausted through the mixed air exhaust 238 back into the conduit structure 154.

In operation, the contaminated air volume 120 impinges upon the restrictor plate 200 and is drawn to the periphery thereof by the negative pressure in the contaminated air channel 208. The contaminated air volume 120 flows through the peripheral contaminated air inlet 206 and the contaminated air channel 208.

The ambient air volume 173 enters the ambient air channel 222 through the aperture defined in the exterior channel wall 209. The ambient air volume 173 is drawn through the ambient air channel 222 by the negative pressure therein. The inlet volume control 226 is adjusted to achieve a desired mixing ratio of the ambient air volume 173 and the contaminated air volume 120 to achieve a desired mixed air volume 180.

The throat 212 is set at a desired area by adjusting the inlet volume control 210. Adjusting the area of throat 212 affects the turbulence of the contaminated air volume 120 passing therethrough. Achieving a highly agitated state of the contaminated air volume 120 at the point of intersection with the ambient air volume 173 is desirable in order to break up the cloudlike conditions of the contaminated air volume 120. Mixing of the contaminated air volume 120 and the ambient air volume 173 occurs in the mixing channel 236 and is exhausted through the mixed air exhaust 238 to continue in the form of mist to the air cleaning apparatus 156.

I claim:

1. A system for treating contaminated air from a mechanical industrial process comprising:

a source capture mechanism that continuously captures a contaminated air volume emitted during operation of the mechanical industrial process, the capture mechanism including a structure having a capture opening oriented toward a source of the contaminated air volume;

mixing means operably connected to the capture mechanism for mixing the contaminated air volume with an ambient air volume to produce a mixed air volume that is generally prevented from exhibiting aerosol bulk motion characteristics of a cloud, the ambient air volume being obtained from a source that is different than the source of the contaminated air volume , said mixing means effecting a reduction in temperature in said contaminated air volume and inducing a turbulent condition therein promoting a reduced concentration thereof in combination with said ambient air volume;

air cleaning apparatus;

conduit structure operably connected to the mixing means and the air cleaning apparatus to transport the mixed air volume therebetween; and means for moving the mixed air volume through the conduit structure at a given air volume velocity.

2. The system of claim 1 wherein the mixing means mix the contaminated air volume with an ambient air volume to produce a mixed air volume having a ratio of the ambient air volume to contaminated air volume that is within a range of 5:1 to 100:1.

3. The system of claim 2 wherein the mixing means mix the ambient air volume with the contaminated air volume to produce a mixed air volume having a ratio that is within a range of 10:1 to 25:1.

4. The system of claim 1 wherein the mixing means mix the contaminated air volume with the ambient air volume to achieve an average energy as indicated by temperature of the mixed air volume at an entrance to the cleaning apparatus that is not more than about 5° C. above an average energy as indicated by temperature of the ambient air volume at the entrance to the air cleaning system.

5. The system of claim 4 wherein the mixing means mix the contaminated air volume with the ambient air volume to achieve an average energy as indicated by temperature of the mixed air volume is less than about 2° C. above the average energy as indicated by temperature of the ambient air volume.

6. The system of claim 1 wherein the means for moving the mixed air volume through the conduit structure has sufficient capacity to move a minimum air volume of 250 cubic meters per hour from the mechanical industrial process as the given air volume velocity.

7. The system of claim 1 wherein there are a plurality of separate mechanical industrial processes and wherein the system comprises:

a source capture mechanism associated with each of the plurality of industrial processes; and conduit structure for operably connecting each of the source capture mechanisms to the mixing means and the air cleaning apparatus.

8. The system of claim 1 wherein the mixing means comprises structure operably positioned between the capture opening and the source of the contaminated air volume and source of the ambient air volume, the structure defining at least one common opening through which the contaminated air volume and the ambient air volume pass.

9. The system of claim 1 wherein the mixing means comprises structure defining at least one non-capture opening located downstream of the capture opening and operably connected to the source of the ambient air volume and structure defining at least one common opening through which the contaminated air volume and the ambient air volume pass.

10. The system of claims 8 or 9 wherein a cross-sectional area of the at least one common opening for a particular mechanical industrial process is selected such that the cross-sectional area is less than or equal to a total of the contaminated air volume and the ambient air volume divided by the given air volume velocity for unit time.

11. The system of claims 8 or 9 wherein a shape of a cross-sectional area of the at least on common opening is selected to maximize one length of the common opening for the cross-sectional area so as to define at least one elongated opening having one opening dimension smaller than 2.5 cm.

12. The system of claims 8 or 9 wherein the at least one, common opening has at least one opening dimension which is small enough to prevent a bulk motion aerosol cloud from passing through the opening intact at a given mixing velocity of the contaminated air volume and the ambient air volume that is between about 5.0 and 25.0 meters per second.

13. The system of claims 8 or 9 wherein the mixing means further comprises means for selectively controlling the contaminated air volume and the ambient air volume.

14. A system for treating contaminated air from a mechanical industrial process having a source capture mechanism that continuously captures a contaminated air volume emitted during operation of the mechanical industrial process, the capture mechanism including a structure having a capture opening oriented toward a source of the contaminated air volume, mixing means operably connected to the capture mechanism for mixing the contaminated air volume with an ambient air volume to produce a mixed air volume that is generally prevented from exhibiting aerosol bulk motion characteristics of a cloud, the ambient air volume being obtained from a source that is different than the source of the contaminated air volume, said mixing means effecting a reduction in temperature in said contaminated air volume and inducing a turbulent condition therein promoting a reduced concencration thereof in combination with said ambient air volume, air cleaning apparatus, conduit structure operably connected to the mixing means and the air cleaning apparatus to transport the mixed air volume therebetween, and means for moving the mixed air volume through the conduit structure at a given air volume velocity wherein the contaminated air volume comprises a heterogenous multi-component mixed density fluid.

15. The system of claim 14 wherein the capture opening has structure providing for the capture of the heterogeneous fluid, the heterogeneous. fluid being selected from the set consisting of: a first gas component and a second gas component, a first gas component and a liquid component, a first gas component and a solid component, or any combination thereof.

16. The system of claim 1 wherein the conduit structure and the means for moving have a selected arrangement and are operated such that the means for moving the mixed air volume through the selected arrangement of conduit structure has sufficient capacity so as to provide for an average residence time of the mixed air volume when moved through the conduit structure at the given air volume velocity that is greater than a maximum condensation time of a gaseous phase of any vapor component of the mixed air volume having a vapor pressure of less than about 10.0 mm/Hg.

17. The system of claim 1 wherein the conduit structure includes an input end, an output end, an average cross-sectional area and an effective length and wherein the means for moving establishes a negative pressure at the output end to create the given air volume velocity of the mixed air volume such that an average residence time is equal to the effective length of the conduit structure divided by the given air volume velocity.

18. The system of claim 1 wherein the air cleaning apparatus comprises:

a removal unit having plurality of vertically-oriented separation tubes, each separation tube including a plurality of helical elements longitudinally disposed within the separation tube, each helical element being offset in orientation with respect to any adjacent helical elements; and a filtration unit capable of filtering out 99.99% of any liquid or solid phase particulates greater than 1 micron in diameter.

19. The system of claim 18 wherein the separation tubes of the removal unit have sufficient contaminant removal capacity over a prolonged period of time such that the air cleaning system operates for more than 4000 hours at no more than 3.5 inches pressure drop across the filtration unit.

20. The system of claim 1 wherein the capture mechanism has structure providing for the capture of a required volume of mixed air, the volume of mixed air that is required for a selected mechanical industrial process being established based upon a horsepower rating of a motor used by the process according to the following formula:

$$Vol_{hp} = 30 * C_t * (1 + (P_c * (P-100)))$$

where $Vol_{hp}$ is the desired airflow volume in cubic feet per minute per horsepower (cfm/hp) for the motor, $C_t$ is a coolant factor depending upon a type of a coolant used in the process, $P_c$ is a coolant pressure constant and P is a coolant pressure of the coolant in pounds per square inch (psi) and wherein $Vol_{hp}$ is increased by 50% if the horsepower rating of the motor is greater than 30 hp and $Vol_{hp}$ is increased by 33% if the motor is enclosed within an enclosure associated with the process.

21. A system for treating contaminated air that is produced by an air-contaminating process, the system comprising:

a source capture mechanism having a capture opening directed to receive a contaminated air volume that includes a vapor pressure/temperature zone conducive to developing bulk motion characteristics of a cloud at the source capture mechanism;

an air cleaning apparatus;

conduit structure operably connected between the air cleaning apparatus and the source capture mechanism to transport air from the source capture mechanism toward the air cleaning apparatus;

an air moving apparatus operably coupled with the conduit structure to move air from the source capture mechanism to the air cleaning apparatus; and a mixing mechanism operably coupled with at least one of the source capture mechanism and the conduit structure to mix the contaminated air volume with an ambient air volume to form a mixed air volume, the mixing mechanism being constructed to dissipate any cloud-like bulk motion characteristics of the mixed air volume before the mixed air volume reaches the air cleaning apparatus, said mixing mechanism effecting a reduction in temperature in said contaminated air volume and inducing a turbulent condition therein promoting a reduced concentration thereof in combination with said ambient air volume.

22. The system of claim 21, wherein the mixing mechanism comprises at least one baffle that defines at least one opening through which the contaminated air volume flows.

23. The system of claim 22, wherein:

at least a portion of the mixing mechanism is located at the source capture mechanism;

the source capture mechanism includes a wall; and the opening is defined between the wall of the source capture mechanism and the baffle.

24. The system of claim 23, wherein the opening between the wall of the source capture mechanism and the baffle is oriented to receive the contaminated air volume and to receive the ambient air volume, the mixing mechanism mixing the contaminated air volume and the ambient air volume together at the opening to form the mixed air volume.

25. The system of claim 22, wherein at least a portion of the mixing mechanism is located along the conduit structure, and the opening is defined between the conduit structure and the baffle.

26. The system of claim 25, wherein the mixing mechanism comprises an ambient air intake, operably coupled with the conduit structure and with the opening defined between the conduit structure and the baffle, to receive the ambient air volume, the contaminated air volume moving through the opening and the ambient air volume moving through the ambient air intake to be mixed together to form the mixed air volume.

27. The system of claim 21, wherein the conduit structure and the air moving apparatus have a selected arrangement and are operated such that the means for moving the mixed air volume through the selected arrangement of conduit structure has sufficient capacity so as to provide an average residence time of the mixed air volume in the conduit structure that is greater than a maximum condensation time of a gaseous phase of any vapor component of the mixed air volume having a vapor pressure of less than about 10.0 mm/Hg.

28. An air treatment system for treating contaminated air from an industrial process, the air treatment system comprising:

an air cleaning apparatus;

means for receiving a contaminated air volume having an average energy, as determined by temperature and vapor pressure characteristics, that is substantially greater than an expected average energy of the contaminated air volume, as determined by temperature and vapor pressure characteristics, such that the contaminated air volume includes at least one cloud formation;

means for reducing the average energy of the contaminated air volume to below the expected average energy of the contaminated air volume such that the air treatment system dissipates the at least one cloud formation of the contaminated air volume, the means for reducing comprising means for adding an ambient air volume to the contaminated air volume to produce a mixed air volume, the means for reducing effecting a reduction in temperature in said contaminated air volume and inducing a turbulent condition therein promoting a reduced concentration thereof in combination with said ambient air volume;

means for guiding the mixed air volume to the air cleaning apparatus; and means for moving air from the means for receiving to the air cleaning apparatus.

29. The air treatment system of claim 28, wherein the means for reducing comprises means for providing an average residence time of the mixed air volume in the means for guiding that is greater than a maximum condensation time of a gaseous phase of any vapor component of the mixed air volume having a vapor pressure of less than about 10.0 mm/Hg.

30. An air treatment system for treating contaminated air produced by an industrial process, the system comprising:

means for receiving a contaminated air volume, the contaminated air volume having cloud-like aerosol bulk motion characteristics;

means for treating the contaminated air volume to reduce the aerosol bulk motion characteristics of a cloud thereof, the means for treating effecting a reduction in temperature in said contaminated air volume and inducing a turbulent condition therein promoting a reduced concentration thereof in combination with an ambient air volume introduced to said contaminated air volume;

a filter unit operably coupled with the means for treating the contaminated air volume;

means for directing the contaminated air volume through the filter unit such that a pressure drop across the filter unit is no more than about 3.0 to 3.5 inches; and means for filtering out 99.99% of any liquid or solid phase particulates greater than 1 micron in diameter with the filter unit for more than 4000 hours without replacing the filter unit.

31. The system of claim 30, wherein the filter unit comprises a HEPA filter unit.

32. The system of claim 30, wherein the means for treating comprises means for condensing gaseous phase vapor components in the contaminated air volume into condensed liquid phase components.

33. The system of claim 32, wherein the means for filtering comprises means for removing condensed liquid phase components of greater than 1 micron in diameter from the contaminated air volume.

34. The system of claim 32, wherein the means for treating comprises means for adding an ambient air volume to the contaminated air volume in a ratio of at least about 5:1.

* * * * *

UNITED STATES PATENT AND TRADEMARK OFFICE
CERTIFICATE OF CORRECTION

PATENT NO. : 5,613,990
DATED : March 25, 1997
INVENTOR(S) : Diachuk

Page 1 of 3

It is certified that error appears in the above-identified patent and that said Letters Patent is hereby corrected as shown below:

Cover page, column 2, line 19, delete "Hienz" and substitute therefor --Hinds--.

Column 1, line 58, delete "factor" and substitute therefor --factory--.

Column 2, line 51, delete "adsorption" and substitute therefor --absorption--.

Column 2, line 55, delete "adsorption" and substitute therefor --absorption--.

Column 3, line 11, delete "hererogenous" and substitute therefor --heterogenous--.

Column 7, line 19, delete "heterogeneous" and substitute therefor --heterogenous--.

Column 7, line 53, delete "e.g.".

Column 8, line 36, delete "sold" and substitute therefor --solid--.

UNITED STATES PATENT AND TRADEMARK OFFICE
CERTIFICATE OF CORRECTION

PATENT NO. : 5,613,990
DATED : March 25, 1997
INVENTOR(S) : Diachuk

It is certified that error appears in the above-identified patent and that said Letters Patent is hereby corrected as shown below:

Column 9, line 30, insert "than" between the words "more" and "4000".

Column 10, line 37, insert a space between "124," and "$Vol_{hp}$".

Column 11, line 36, after the word "as", delete "a".

Column 14, line 34, delete the space between "volume" and ",".

Column 14, line 65, insert "that" between the words "volume" and "is".

UNITED STATES PATENT AND TRADEMARK OFFICE
CERTIFICATE OF CORRECTION

PATENT NO. : 5,613,990
DATED : March 25, 1997
INVENTOR(S) : Diachuk

It is certified that error appears in the above-identified patent and that said Letters Patent is hereby corrected as shown below:

Column 15, line 34, delete "on" and substitute therefor --one--.

Column 15, line 38, delete the comma after the word "one".

Column 15, line 63, delete "concencration" and substitute therefor --concentration--.

Column 16, line 5, delete "heterogeneous" and substitute therefor --heterogenous--.

Column 16, line 6, delete "heterogeneous." and substitute therefor --heterogenous--.

Column 18, line 62, delete "32" and substitute therefor --30--.

Signed and Sealed this

Fourteenth Day of December, 1999

Attest:

Q. TODD DICKINSON

*Attesting Officer*  *Acting Commissioner of Patents and Trademarks*